United States Patent
Dore

(10) Patent No.: US 9,893,926 B2
(45) Date of Patent: Feb. 13, 2018

(54) RECEIVER FOR ALAMOUTI TYPE SPACE-TIME BLOCK CODING FBMC SYSTEM

(71) Applicant: COMMISSARIAT A L'ENERGIE ATOMIQUE ET AUX ENERGIES ALTERNATIVES, Paris (FR)

(72) Inventor: Jean-Baptiste Dore, Fontanil-Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/485,723

(22) Filed: Apr. 12, 2017

(65) Prior Publication Data

US 2017/0310527 A1 Oct. 26, 2017

(30) Foreign Application Priority Data

Apr. 13, 2016 (FR) .................................. 16 53277

(51) Int. Cl.
*H04B 7/04* (2017.01)
*H04L 1/06* (2006.01)
(Continued)

(52) U.S. Cl.
CPC ............ *H04L 27/34* (2013.01); *H04L 27/264* (2013.01); *H04L 27/265* (2013.01); *H04B 7/04* (2013.01); *H04L 1/0668* (2013.01)

(58) Field of Classification Search
CPC ... H04L 1/0668; H04L 27/264; H04L 27/265; H04L 27/34; H04B 7/04
See application file for complete search history.

(56) References Cited

U.S. PATENT DOCUMENTS

2014/0348252 A1   11/2014   Siohan et al.
2015/0009906 A1    1/2015   Dore et al.
(Continued)

OTHER PUBLICATIONS

Zakaria et al., "A Novel Filter-Bank Multicarrier Scheme to Mitigate the Intrinsic Interference: Application to MIMO Systems," Mar. 2012, IEEE Transactions on Wireless Communications, vol. 11, Issue 3, pp. 1112-1123.*

(Continued)

*Primary Examiner* — David B. Lugo
(74) *Attorney, Agent, or Firm* — Oblon, McClelland, Maier & Neustadt, L.L.P.

(57) ABSTRACT

A method of reception of signals transmitted by a FBMC transmitter using a block Alamouti coding. After demodulation in a base band, the received signal is sampled, with the sample blocks undergoing a sliding FFT before being de-multiplexed towards a first path during a first use of the channel and a second path during a second use of the channel. The vectors received on the first path are multiplied by a first and a second transfer matrix, conjugated to provide first and second vectors. The vectors received on a second path undergo time-reversal and complex conjugation and, if appropriate, multiplication by an imaginary factor, depending on the size of the blocks. The vectors thus obtained are multiplied by first and second transfer matrices to provide third and fourth vectors. The first and fourth (second and third vectors) are then combined and the combined vector is filtered and spectrally de-spread to give an estimate of the block transmitted by the first (second) antenna of the transmitter during the first use of the channel.

9 Claims, 10 Drawing Sheets

(51) Int. Cl.
*H04L 27/26* (2006.01)
*H04L 27/34* (2006.01)

(56) References Cited

U.S. PATENT DOCUMENTS

| | | | |
|---|---|---|---|
| 2015/0124749 A1 | 5/2015 | Mawlawi et al. | |
| 2016/0013961 A1* | 1/2016 | Dore | H04L 27/264 375/316 |
| 2016/0301554 A1 | 10/2016 | Dore | |
| 2017/0012676 A1 | 1/2017 | Courouve et al. | |
| 2017/0012808 A1 | 1/2017 | Courouve et al. | |
| 2017/0019223 A1 | 1/2017 | Mawlawi et al. | |
| 2017/0085308 A1* | 3/2017 | Sun | H04B 7/0617 |

OTHER PUBLICATIONS

Na et al., "Intrinsic ICI-Free Alamouti Coded FBMC," Jul. 2016, IEEE Communications Letters, vol. 20, Issue 10, pp. 1971-1974.*

Le et al., "On the Performance of Alamouti Scheme in 2 x 2 MIMO-FBMC Systems," Aug. 2016, 19th International Conference on OFDM and Frequency Domain Techniques (ICOF 2016), pp. 28-33.*

French Preliminary Search Report dated Dec. 1, 2016 in French Application 16 53277 filed on Apr. 13, 2016 (with English Translation of Categories of Cited Documents).

Markku Renfors, et al., "A Block-Alamouti Scheme for Filter Bank Based Multicarrier Transmission", European Wireless Conference, IEEE, 2010, 7 pgs.

Maurice Bellanger, "FS-FBMC: an alternative scheme for filter bank based multicarrier transmission", Proceedings of the $5^{th}$ International Symposium on Communications, Control and Signal Processing, IEEE, 2012, 4 pgs.

R. Zakaria, et al., "On interference cancellation in Alamouti coding scheme for filter bank based multicarrier systems", The Tenth International Symposium on Wireless Communication Systems, 2013, 5 pgs.

Botaro Hirosaki, "An Orthogonally Multiplexed QAM System Using the Discrete Fourier Transform", IEEE Transactions on Communications, vol. COM-29, (7), 1981, 8 pgs.

Pierre Siohan, et al., "Analysis and Design of OFDM/OQAM Systems Based on Filterbank Theory", IEEE Transactions on Signal Processing, vol. 50, (5), 2002, 14 pgs.

M. Bellanger, et al., "FBMC physical layer: a primer", PHYDYAS, 2010, 31 pgs.

Erik Lindskog, et al., "A Transmit Diversity Scheme for Channels with Intersymbol Interference", IEEE, 2000, 5 pgs.

U.S. Appl. No. 15/485,700, filed Apr. 12, 2017, Jean-Baptiste Dore.

* cited by examiner

RECEIVER FOR ALAMOUTI TYPE SPACE-TIME BLOCK CODING FBMC SYSTEM

TECHNICAL FIELD

The present invention relates in general to the field of telecommunications systems that use a filter bank multi-carrier (FBMC) modulation system. It also relates to MISO (Multiple Input Single Output) or even MIMO (Multiple Input Multiple Output) telecommunication systems that use space-time coding.

STATE OF THE PRIOR ART

Telecommunication systems which use multi-carrier modulation are well known in the state of the art. The principle for such modulation involves dividing the transmission band into a plurality of frequency sub-channels associated with sub-carriers and modulating each of these sub-carriers using the data to be transmitted.

The most widely used multi-carrier modulation is without doubt Orthogonal Frequency Division Multiplexing (OFDM) modulation. However, since the spectral occupation of an OFDM signal is substantially greater than the band of sub-carriers that it uses because of the spreading of the secondary lobes, OFDM modulation is not an optimum solution for applications that require high levels of out-of-band rejection.

Modulation using banks of filters or Filter Bank Multi-Carrier modulation (FBMC) is multi-carrier modulation that provides better spectral localisation within the band of sub-carriers. It is moreover one of the possible solutions for fifth generation telecommunication systems.

The principle of FBMC modulation is based on synthesis using a filter bank on transmission and analysis using a filter bank on reception, where the product of the transfer function of a filter at transmission and the transfer function of the corresponding filter at reception is equal to the transfer function of the Nyquist filter.

FBMC systems are conventionally implemented in the time domain. The structure of an FBMC system implemented in the time domain has been described in detail in the article by Hirosaki entitled "An orthogonally multiplexed QAM system using the discrete Fourier transform" published in IEEE Trans on Comm., vol. 29 No. 7, pp. 982-989, July 1981, as well as in the article by P. Siohan et al. entitled "Analysis and design of OFDM/OQAM systems based on filterbank theory" published in IEEE Trans. on signal processing, vol. 50, No 5, pp. 1170-1183, May 2002. FBMC systems implemented in the time domain make use of networks of polyphase filters, hence their denomination of PPN-FBMC (Polyphase Network FBMC).

More recently the implementation of an FBMC system in the frequency domain has been proposed as described in the document by M. Bellanger et al. entitled "FBMC physical layer: a primer" available at the website www.ict-phydyas.org. FBMC systems implemented in the frequency domain make use of spectral spread, hence their denomination of FS-FBMC (Frequency Spread FBMC).

The structure of an FS-FBMC system is shown in FIG. 1.

At the transmitter, the QAM modulation symbols to be transmitted at a rate Nf where f=1/T are grouped together in blocks of size N, $x_0[n], \ldots, x_{N-1}[n]$ where n is the time index of the block. Each block of N symbols is supplied in parallel to N input paths of a pre-processing module, 110, called Offset QAM pre-processing (OQAM). The function of this pre-processing module is to demultiplex the real portion and imaginary portion of the input signals with a frequency 2f, so that of two samples transmitted at the same instant over two successive sub-channels or two samples transmitted at two successive instants over the same channel, one is real and one is imaginary. Each of the N output paths from the pre-processing module 110 corresponds to a sub-channel.

Each sub-channel is then spread over an interval of 2K−1 adjacent sub-carriers, centered on a central sub-carrier of the sub-channel. More specifically, each item of OQAM data is spread over 2K−1 adjacent sub-carriers and weighted by the (real) value taken by the synthesis filter transfer function at the corresponding frequency.

Reference 120 designates the module for frequency spread and filtering by the prototype filter. Each item of OQAM data $d_i[n]$ at the input to the module 120 is spread over 2K−1 adjacent sub-carriers to give:

$$\check{d}_{i,k}[n]=d_i[n]G_k, k=-K+1,\ldots,0,\ldots,K-1 \quad (1)$$

Data with the same parity i and i+2 are spectrally separated and data with opposite parities i and i+1 overlap as shown in FIG. 2A. This overlap does not however result in any interference, since two items of data with opposite parities are necessarily located on the real axis and on the imaginary axis and are separated by T/2. For example, in FIG. 2A, the data $d_i[n]$ and $d_{i+2}[n]$ are real values (shown as continuous lines) whereas the data item $d_{i+1}[n]$ is an imaginary value (represented by broken lines). The imaginary values are presented to the input to the IFFT module with an offset of T/2 relative to the real values. Orthogonality in the complex plane is preserved by the filtering by the prototype filter, given that the coefficients $G_k$ are real.

The data spread over frequency and filtered then undergoes an IFFT of size KN in 130.

The block of temporal sample at the output of the IFFT is combined using the combination module 140 as indicated in FIG. 3. All of the samples at the output of the IFFT represent an FBMC symbol in the time domain, with two successive FBMC symbols being offset by T/2 (in other words N/2 samples) and each of the FBMC symbols having a duration KT (in other words a size of KN samples). An FBMC symbol is combined in module 140 with the K−1 preceding FBMC symbols and K−1 following FBMC symbols. For this reason K is also called the overlapping factor or interlacing factor. It can be seen that a sample at the output of the combination module 140 is the sum of 2K−1 consecutive samples of FBMC symbols.

The signal thus obtained is then translated to a carrier frequency.

After transmission on the channel 150, the received signal, base band demodulated, is sampled by the receiver at a rate Nf then converted into blocks of size KN by the serial-parallel converter 160.

A sliding FFT (the window of the sliding FFT for N/2 samples between two FFT calculations) of size KN is carried out in the FFT module 170 on blocks of KN consecutive samples at the output from the serial-parallel converter 160.

The outputs from the FFT then undergo filtering and spectral de-spreading in module 180. The de-spreading operation takes place in the frequency domain as shown in FIG. 2B. More specifically, the samples $\hat{d}_{i,k}^r[n]$, $k=-K+1,\ldots,0,\ldots,K-1$ which correspond to the 2K−1 frequencies $(i-1)K+1,\ldots iK,\ldots (i+1)K-1$ of the FFT are multiplied by the values of the transfer function of the analysis filter (translated in frequency from that of the prototype filter) at the frequencies in question and the results obtained are summed, that is:

$$d_i^r[n] = \sum_{k=-K+1}^{K-1} G_k \tilde{d}_{i,k}^r[n] \qquad (2)$$

It can be seen that as in FIG. 2A, obtaining data which has ranks of the same parity, for example $d_i^r[n]$ and $d_{i+2}^r[n]$, makes use of disjoint sample blocks whereas those of two consecutive ranks, with inverse parities, overlap. Thus obtaining the data item $d_{i+1}^r[n]$ makes use of samples $\check{d}_{i,k}^r[n]$, $k=1, \ldots, K-1$ as well as of samples $\check{d}_{i+2,k}^r[n]$, $k=-K+1, \ldots, 1$.

The de-spreading of real data is represented by continuous lines whereas that for imaginary data is represented by dotted lines.

The data $d_i^r[n]$ thus obtained are then supplied a post-processing module 190 which carries out the reverse processing of that of module 110, in other words OQAM demodulation. The QAM symbols are thus restored.

FBMC technology is one of the candidate technologies for fifth generation wireless telecommunication systems. In particular the latter must allow the requirements of spectral fragmentation and transmission asynchronism of MTC (Machine Type Communication) communications to be met.

The application of FBMC technology to MIMO (Multiple Input Multiple Output) spatial diversity type telecommunication systems is however much more complicated than in OFDM because FBMC transmission intrinsically uses orthogonality in the complex plane to eliminate interference between FBMC symbols.

Spatial Time Block Coding, or STBC, of the Alamouti type has recently been proposed for a FBMC system in the article by M. Renfors et al. entitled "A block-Alamouti scheme for filter bank based multicarrier transmission" published in Proceedings of European Wireless Conference EW 2010, Apr. 12-15, 2010, Lucca, Italy. 2010. pp. 1031-1037.

It should first of all be recalled that Alamouti coding is STBC (Space Time Block Coding) which is applied to a configuration with two transmission antennas and one reception antenna. Its coding matrix is given by:

$$C = \begin{pmatrix} x_0 & x_1 \\ -x_1^* & x_0^* \end{pmatrix} \qquad (3)$$

wherein $x_0$ and $x_1$ are two complex symbols (belonging to a modulation alphabet) to be transmitted. During a first use of the channel (that is, a first transmission interval) the transmission antennas respectively transmit $x_0$ and $x_1$, and during a second use of the channel these antennas transmit $-x_1^*$ and $x_0^*$.

The signals received, respectively, during the first and second use of the channel, $y_0$, $y_1$ may then be expressed in the following form:

$$y_0 = h_0 x_0 + h_1 x_1 + n_0 \qquad (4-1)$$

$$y_1 = -h_0 x_1^* + h_1 x_0^* + n_1 \qquad (4-2)$$

where $h_0, h_1$ are, respectively, the complex coefficient of the first elementary channel between the first transmission antenna and the reception antenna, and the complex coefficient of the second elementary channel between the second transmission antenna and the reception antenna, and where $n_0, n_1$ are noise samples, assumed to be additive and independent, from a given centred white Gaussian process.

Assuming that the channel is known, the receiver estimates the transmitted symbols from a combination of the received signals:

$$\hat{x}_0 = \frac{1}{|h_0|^2 + |h_1|^2}(h_0^* y_0 + h_1 y_1^*) = x_0 + \frac{h_0^* n_0 + h_1 n_1^*}{|h_0|^2 + |h_1|^2} \qquad (5-1)$$

$$\hat{x}_1 = \frac{1}{|h_0|^2 - |h_1|^2}(h_1^* y_0 + h_0 y_1^*) = x_1 + \frac{h_1^* n_0 - h_0 n_1^*}{|h_0|^2 + |h_1|^2} \qquad (5-2)$$

The aforementioned article by Renfors makes use of an appropriate filtering technique, already used for Alamouti coding in the presence of intersymbol interference, described in the article by E. Lindskog et al. entitled "A transmit scheme for channels with intersymbol interference" published in Proc. IEEE of Int'l Conf. on Communications, ICC 2000, pp. 307-311, June 2000.

The Alamouti coding is carried out using blocks of input data vectors, a block being made up of a sequence of L column vectors, and which may therefore be represented by a matrix $\overline{X}$ of size N×L where N is the number of sub-carriers. Each column vector of the matrix $\overline{X}$, that is $X^m$, $m=0, \ldots, L-1$, here represents a vector of complex signals at the output of the OQAM modulator. It will be recalled that because of OQAM modulation, of any two adjacent elements (along lines or in columns) of the matrix $\overline{X}$, one is real and the other imaginary.

If two successive blocks are referred to as $\overline{X}_0$ and $\overline{X}_1$, the Alamouti block coding matrix, as proposed in the article by Renfors, can be expressed in the following form:

$$\overline{C} = \begin{pmatrix} \overline{X}_0 & \overline{X}_1 \\ -\overline{X}_1^* T & \overline{X}_0^* T \end{pmatrix} \qquad (6)$$

The block-columns of the block-matrix here represent the antennae and the block-lines represent the uses of the channel. In each of the blocks, the lines represent the sub-carriers and the columns represent the time. T is an anti-diagonal matrix of size L×L all of whose anti-diagonal elements are equal to 1, and thus translates a time reversal. Thus, if $\overline{X}$ is a sequence of vectors $X^0, X^1, \ldots, X^{L-1}$ the block XT is made up of the sequence $X^{L-1}, X^{L-2}, \ldots, X^0$.

La FIG. 4 schematically shows a sequence of blocks of symbols transmitted by an FBMC transmitter using block Alamouti coding.

A first sequence of blocks 401 is formed by a first guard block 411, a first block of L symbol vectors, $\overline{X}_0$, 421, a second guard block, 431, a first transformed block, $-\overline{X}_1^*T$, 441, made up of L symbol vectors, followed by a third guard block 451.

A second sequence of blocks 402 is formed by a first guard block 421, a second block made up of L symbol vectors, $\overline{X}_1$, 422, a second guard block, 432, a second transformed block, $\overline{X}_0^*T$, 442, made up of L symbol vectors, followed by a third guard block, 452.

The guard blocks are made up of null symbols, and their purpose is to isolate successive blocks from interference generated by adjacent blocks.

The first sequence of blocks is transmitted by the first antenna 491 after FBMC modulation. The signal obtained at the output from the FBMC modulator may be regarded as a sequence of FBMC symbols overlapping in time, as explained in relation to FIG. 3. The signal thus obtained is transmitted on the first antenna, after having been translated to an RF band.

Similarly, the second sequence of blocks is transmitted by the second antenna 492 after having been modulated by a second FBMC modulator with an identical structure to the first.

FIG. 5 schematically shows the architecture of an FBMC receiver used to receive sequences of blocks of symbols transmitted by the transmitter in FIG. 4. It is essential to note that this FBMC receiver exhibits conventional architecture (time-based implementation) and not FS-FBMC architecture (frequency-based implementation).

The receiver comprises a sampling module 510 for sampling the signal received in a base band at the rate Nf where N is the number of sub-carriers and f is the frequency of the FBMC symbols. The samples are grouped together in the form of blocks of size N by a serial-parallel converter 520.

Each block is filtered by a transmultiplexer made up of a battery of N polyphase filters (PPN), 530, then undergoes an FFT of size N, in the FFT module 540, which operates on the N outputs from these filters.

The receiver is assumed to be synchronised on the FBMC symbols, in other words the start of an FFT window coincides with the first sample of an FBMC symbol (transmitted by one or the other of the transmission antennae). Moreover the receiver is assumed to be synchronised on the instants of use of the channel so that it knows the instants of reception of the first and second blocks.

A demultiplexer 550 supplies the vectors at the output from the FFT at a first output 551 during the first use of the channel and at a second output 552 during the second use of the channel. The L vectors (of size N) generated sequentially at the first output are stored in a first buffer memory 561, configured in the form of a FIFO (first-in first-out) buffer. The L vectors generated sequentially at the second output are also stored in a second buffer memory 562 configured in the form of a LIFO (last-in first-out) buffer. The conjugation module 570 thus reads the L vectors in the reverse order to that in which they are stored, so as to perform a time-reversal, and carries out a complex conjugation of each of these vectors.

Each element of a vector generated at the first output is multiplied in 581 by the complex conjugate of the coefficient of the first elementary channel between the first transmission antenna and the reception antenna at the frequency of the sub-carrier carrying the element in question (the operation is symbolised here by a multiplication of the vector at the output from the buffer memory by the matrix $H_0^*$ defined below) and in 583 by the complex conjugate of the coefficient of the second elementary channel between the second transmission antenna and the reception antenna at the same sub-carrier frequency (the operation is symbolised here by a multiplication of the vector of samples at the FFT output by the matrix $H_1^*$). The matrices $H_0$ and $H_1$ are here understood to be of size N×N and here represent the coefficients of the elementary channels for the N sub-carriers. The matrices $H_0$ and $H_1$ are diagonal. It is assumed that the matrices $H_0$ and $H_1$ are constant over the duration of the sequence (flat fading over time is assumed).

Similarly, each element of a vector generated at the second output is multiplied in 582 by the coefficient of the channel between the first transmission antenna and the reception antenna at the frequency of the sub-carrier carrying the element in question (operation symbolised by a multiplication of the vector at the output of the FFT by the matrix $H_0$) and in 584 by the coefficient of the channel between the second transmission antenna and the reception antenna at the frequency of the same sub-carrier (operation symbolised by a multiplication of the vector at the output of the FFT by the matrix $H_1$).

The vectors at the output of the multiplier 581 are summed, element by element, with those at the output of the multiplier 584 in the summer 591. The successive vectors at the output of the summer 591 are then supplied to a first OQAM demodulator (not shown).

Similarly the vectors at the output of the multiplier 583 are subtracted, element by element, from those at the output of the multiplier 582, in the summer 592. The successive vectors at the output of the summer 592 are then supplied to a second OQAM demodulator (not shown).

In other words, if $\overline{Y}_0$ and $\overline{Y}_1$ represent the matrices of size N×L which represent the sequence of L column vectors at the output from the FFT, during the first and second use of the channel respectively, the estimates of the vectors of symbols $\overline{X}_0$ and $\overline{X}_1$ are obtained by:

$$\hat{\overline{X}}_0 = \frac{1}{Tr(H_0^* H_0 + H_1^* H_1)} (H_0^* \overline{Y}_0 + H_1 \overline{Y}_1^* T) \qquad (7\text{-}1)$$

$$\hat{\overline{X}}_1 = \frac{1}{Tr(H_0^* H_0 + H_1^* H_1)} (H_1^* \overline{Y}_0 - H_0 \overline{Y}_1^* T) \qquad (7\text{-}2)$$

The reception method described above works for an FBMC receiver implemented using a battery of polyphase filters. It is not applicable to an FS-FBMC receiver as described in relation to the right hand portion of FIG. 1, given that the filtering is then carried out downstream of the FFT.

The purpose of the present invention is consequently to offer a method of reception of a sequence of blocks of FBMC symbols coded using block Alamouti coding, which functions for an FS-FBMC receiver. The present invention also relates to an FS FBMC receiver capable of implementing this method of reception.

DESCRIPTION OF THE INVENTION

The present invention is defined by a method for reception of signals transmitted by a FBMC transmitter using block Alamouti coding, where the FBMC transmitter uses a plurality N of sub-carriers and an overlap factor K of prototype filters, where the signal received by the receiver is translated to a base band, sampled at a frequency Nf where f is the half-frequency of the FBMC symbols, then undergoes a sliding FFT of size KN to provide sample vectors, wherein said sample vectors are received on a first path during a first channel use and on a second path during a second channel use, the channel comprising a first elementary channel between a first antenna of the transmitter and a first antennae of the receiver and a second elementary channel between a second antenna of the transmitter and a second antenna of the receiver, said first and second elementary channels being characterised, respectively, by a first and a second transfer matrix ($H_0, H_1$), each vector ($W_0^m$) in a sequence of vectors received on the first path being multiplied by the conjugate of the first transfer matrix in order to provide a first vector and by the conjugate of the second transfer matrix in order to provide a second vector, where a sequence of vectors received on the second path is time-reversed and each vector ($W_1^{L-1-m}$) of the second sequence is conjugated before being multiplied by the first transfer matrix to provide a third vector and by the second transfer matrix to provide a fourth vector, where the first and fourth vectors are combined to provide a first combined vector, the second and third vectors are combined to provide a second combined vector, where the first and second combined vectors are spectrally de-spread and filtered in the frequency domain by the prototype filters in order to provide, respectively, an estimate of a first data vector ($\hat{X}_0^m$) transmitted via the first antenna of the transmitter and a second data vector ($\hat{X}_1^m$) transmitted via the second transmitter antenna.

According to a first alternative, the first and second antennas of the receiver form a single antenna, and said sample vectors are demultiplexed on the first path during the first use of the channel and on the second path during the second use of the channel.

According to a second alternative, the first and second antennas are distinct, with the first path being associated with the first antenna of the receiver and the second path being associated with the second antenna of the receiver.

Advantageously, if the transmitter uses the following matrix as a block Alamouti coding matrix:

$$\overline{C} = \begin{pmatrix} \overline{X}_0 & \overline{X}_1 \\ -\overline{X}_1 T & \overline{X}_0 T \end{pmatrix}$$

where $\overline{X}_0$ and $\overline{X}_1$ are first and second blocks of input data vectors transmitted during the first use of the channel via the first antenna and the second antenna of the receiver respectively, $\overline{X}_1 T$ is a first transformed block obtained by time-reversal and of the second block, $\overline{X}_0 T$ is a second transformed block obtained by time-reversal of the first block, where the blocks $-\overline{X}_1 T$ and $\overline{X}_0 T$ are transmitted during the second use of the channel via the first antenna and the second antenna of the transmitter respectively, according to a first embodiment, the vectors of the second sequence are multiplied by a factor ($j^{L-1}$) where L is the size of the first and second blocks of input data vectors, after conjugation and before multiplication by the first and second transfer matrices.

In this case the input data vector of rank m in the first block of input data vectors, $X_0^m$, and the input data vector of rank m in the second block of input data vectors, $X_1^m$, may then be estimated from:

$$\hat{X}_0^m = \mu G(H_0^* W_0^m + j^{L-1} H_1 W_1^{L-1-m*}) \odot M^{m*}$$

$$\hat{X}_1^m = \mu G(H_1^* W_0^m - j^{L-1} H_0 W_1^{L-1-m*}) \odot M^{m*}$$

where $\hat{X}_0^m$ and $\hat{X}_1^m$ are respectively the estimates of the vectors $X_0^m$ and $X_1^m$, $H_0$, $H_1$ are respectively the first and second transfer matrices, $W_0^m$ the vector of rank m received on the first path, $W_1^{L-1-m}$ the vector of rank L−1−m received on the second path, $M^m$ a vector which represents an OQAM coding of vectors $X_0^m$ and $X_1^m$, G a matrix which represents, in the frequency domain, a spectral de-spreading and filtering by prototype filters, μ is a coefficient of normalisation and ⊙ represents the Hadamard product.

Alternatively, if the transmitter uses this matrix as a block Alamouti coding matrix:

$$\overline{C}' = \begin{pmatrix} \overline{X}_0 & \overline{X}_1 \\ -(j^{L-1})\overline{X}_1 T & (j^{L-1})\overline{X}_0 T \end{pmatrix}$$

where $\overline{X}_0$ and $\overline{X}_1$ are the first and second blocks of input data vectors transmitted during the first use of the channel, via the first antenna and the second antenna respectively of the transmitter, $\overline{X}_1 T$ is a first transformed block obtained by time-reversal and of the second block, $\overline{X}_0 T$ is a second transformed block obtained by time reversal of the first block, according to a second embodiment of the invention, the vectors of the second sequence, after conjugation, are multiplied directly by the first and second transfer matrices.

In this case the input data vector of rank m in the first block of input data vectors, $X_0^m$, and the input data vector of rank m in the second block of input data vectors, $X_1^m$, are estimated from:

$$\hat{X}_0^m = \mu G(H_0^* W_0^m + H_1 W_1^{L-1-m*}) \odot M^{m*}$$

$$\hat{X}_1^m = \mu G(H_1^* W_0^m - H_1 W_1^{L-1-m*}) \odot M^{m*}$$

where $\hat{X}_0^m$ and $\hat{X}_1^m$ are respectively the estimates of the vectors $X_0^m$ and $X_1^m$, $H_0$, $H_1$ are respectively the first and second transfer matrices, $W_0^m$ the vector of rank m received on the first path, $W_1^{L-1-m}$ the vector of rank L−1−m received on the second path, $M^m$ a vector which represents an OQAM coding of vectors $X_0^m$ and $X_1^m$, G a matrix which represents, in the frequency domain, a spectral de-spreading and filtering by prototype filters, μ is a coefficient of normalisation and ⊙ represents the Hadamard product.

In both the preceding cases the first and second blocks of input data vectors may be preceded, respectively, by a first and by a second preamble, with a first guard block made up of null vectors separating the first block of data vectors and the first transformed block, with a second guard block made up of null vectors separating the second block of data vectors and the second transformed block. Since the first and second preambles are known to the receiver, then advantageously on the first path, at the output of the sliding FFT, an elimination of the interference affecting the vectors received on the first path is performed by subtraction from this path of the contribution due to the first and second preambles.

BRIEF DESCRIPTION OF THE ILLUSTRATIONS

Other characteristics and advantages of the invention will appear on reading the preferential embodiments of the invention made in reference to the attached figures, among which:

FIG. 1 schematically shows a FS-FBMC telecommunication system known to the prior art;

Figure 4:
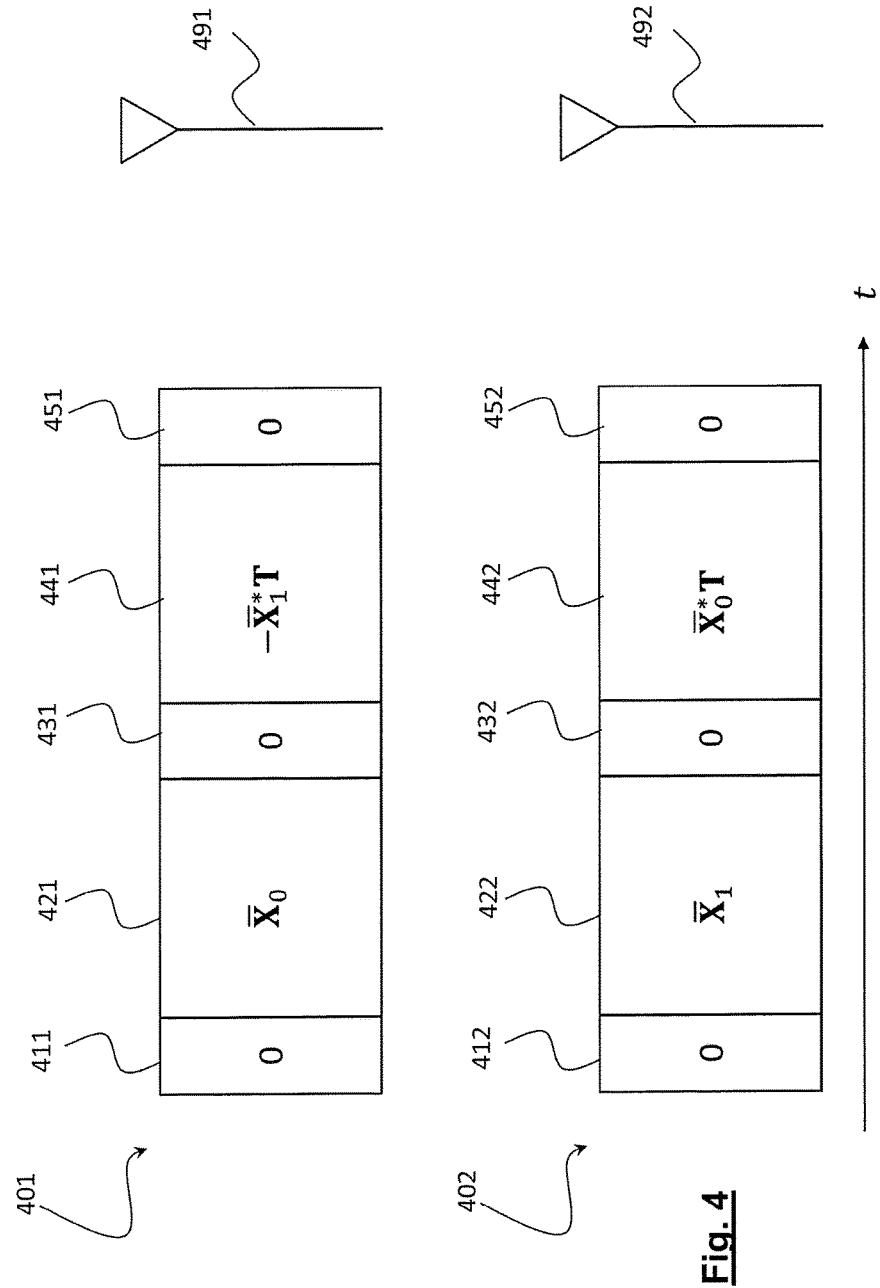
Figure 5:
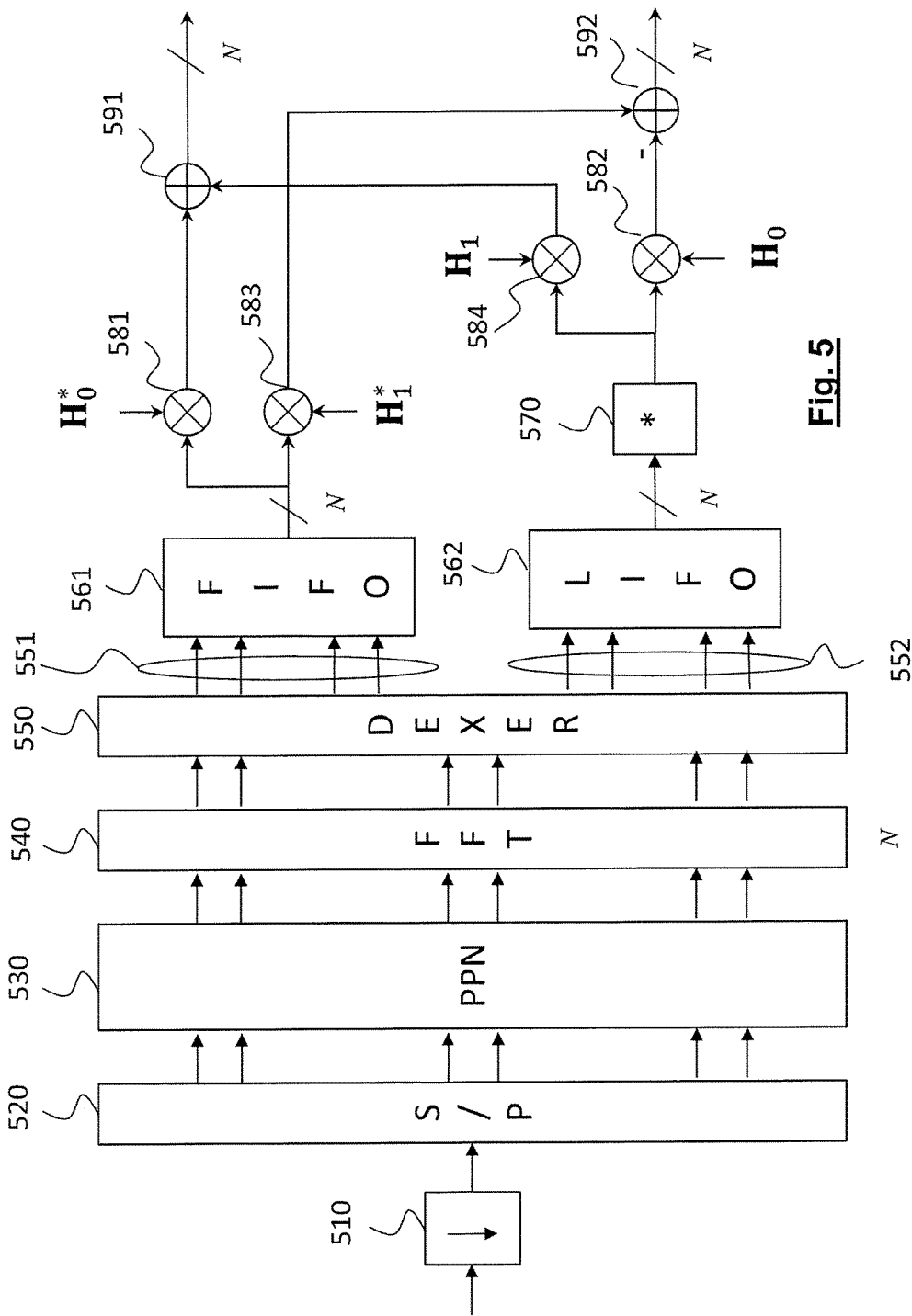
Figure 6:
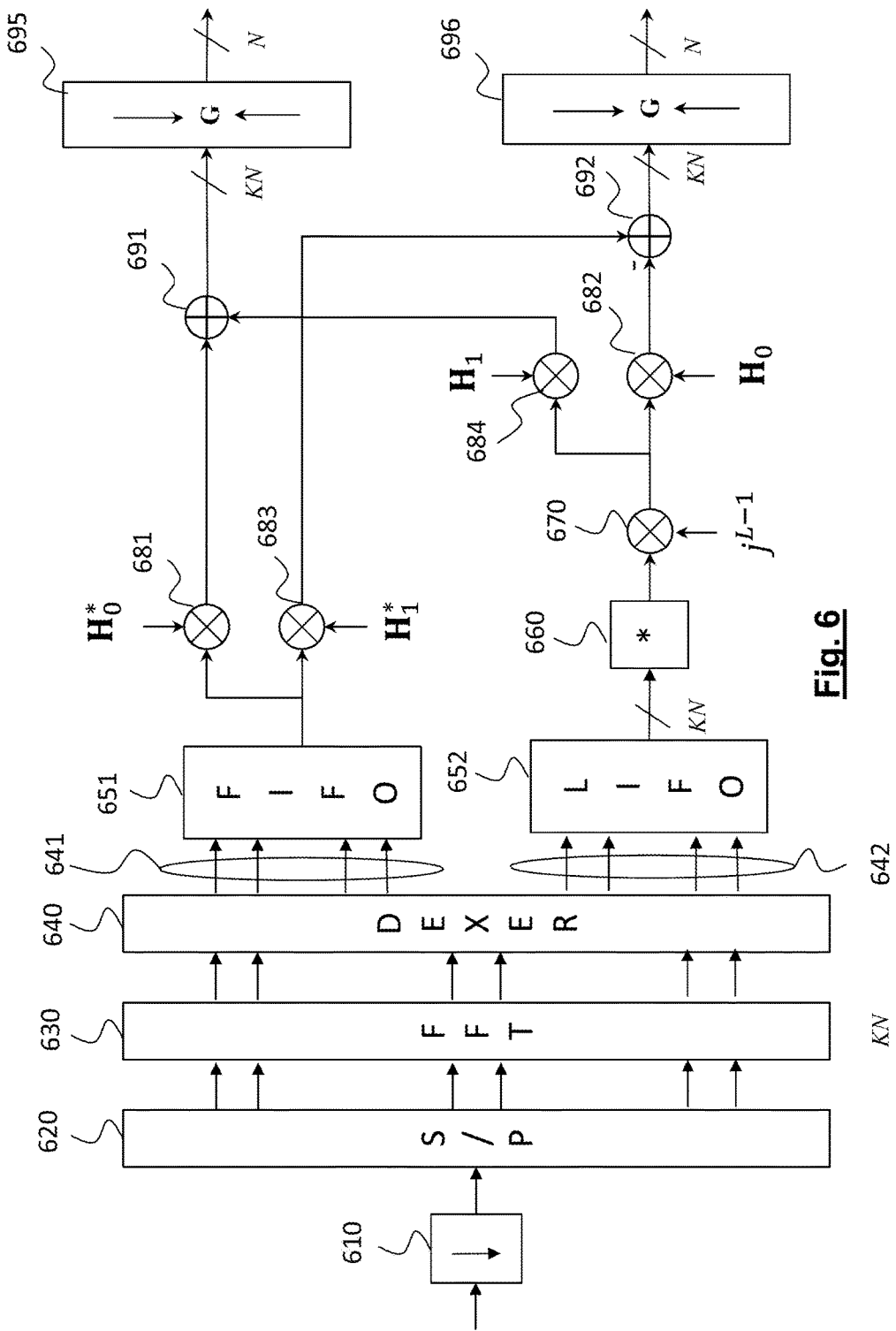
Figure 7:
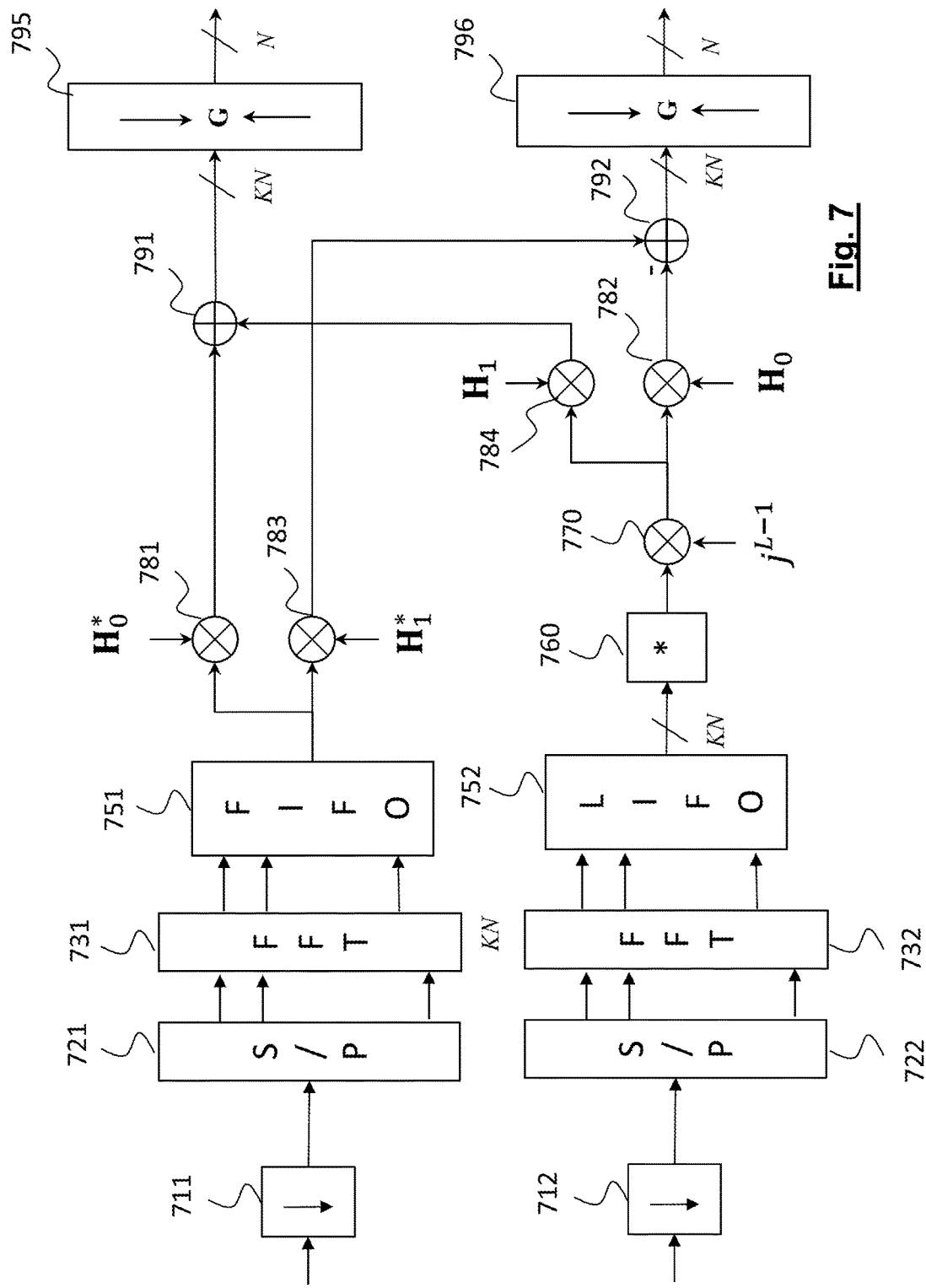

FIG. 4 schematically shows the transmission of two sequences of blocks of symbols by an FBMC transmitter using a block Alamouti coding known in the prior art;

FIG. 5 schematically shows the architecture of an FBMC receiver used to receive sequences of blocks of symbols transmitted by the transmitter in FIG. 4;

FIG. 6 schematically shows the architecture of an FS-FBMC receiver, according to a first embodiment of the invention, used to receive sequences of blocks of symbols coded by a block Alamouti coding;

FIG. 7 schematically shows the architecture of a FS-FBMC receiver according to one alternative of the first embodiment of the invention.

Figure 8A:
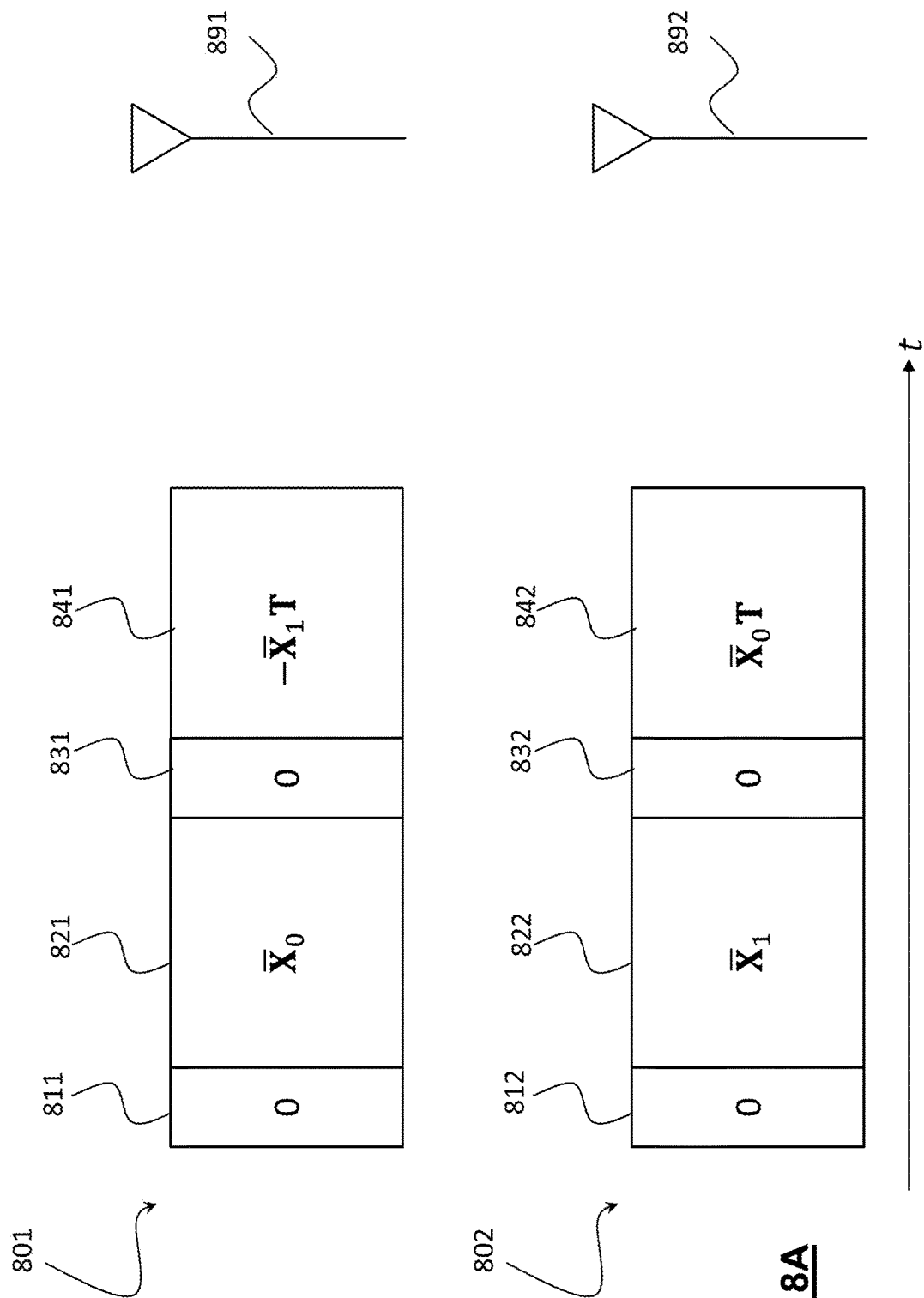
Figure 8B:
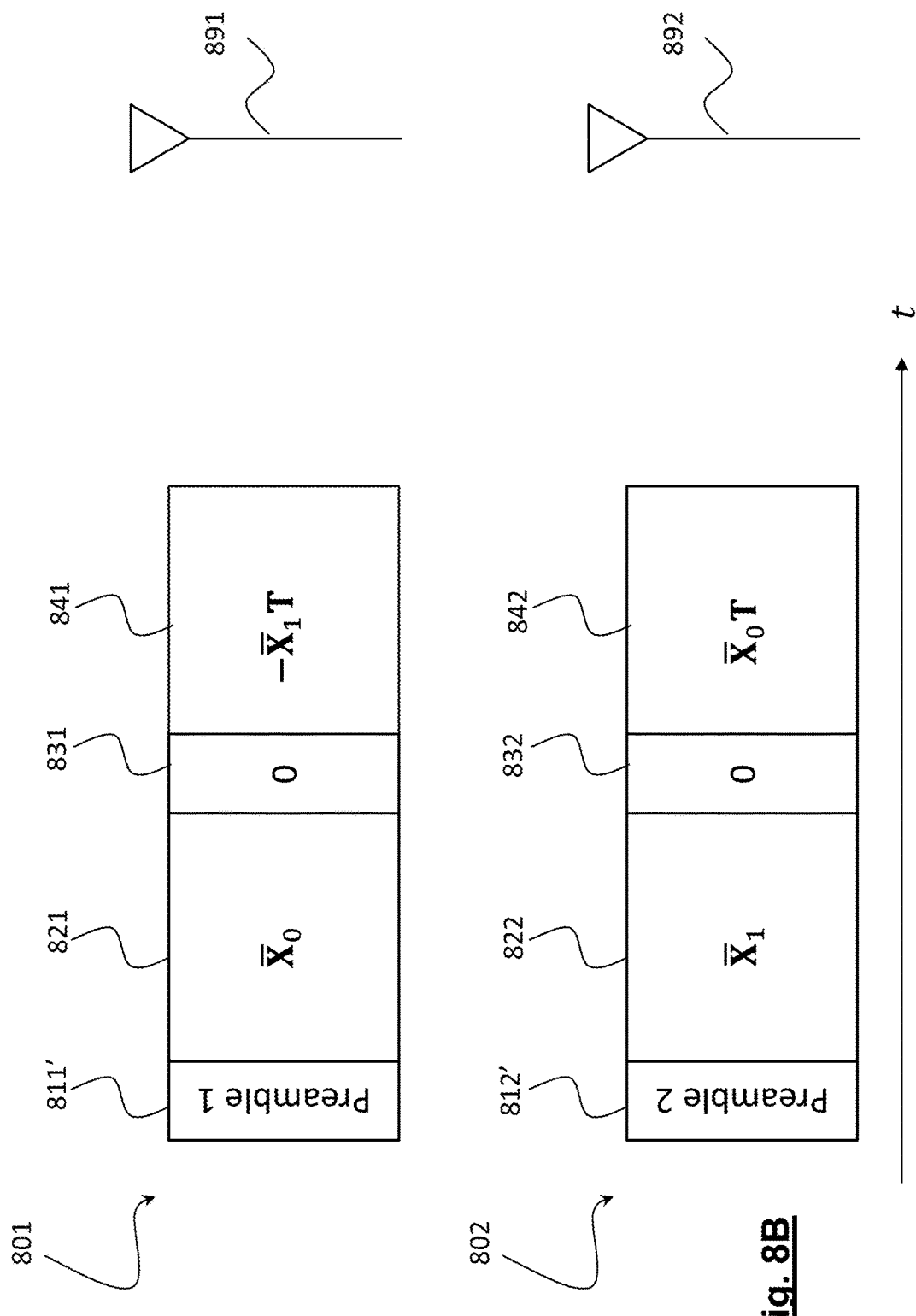
Figure 9:
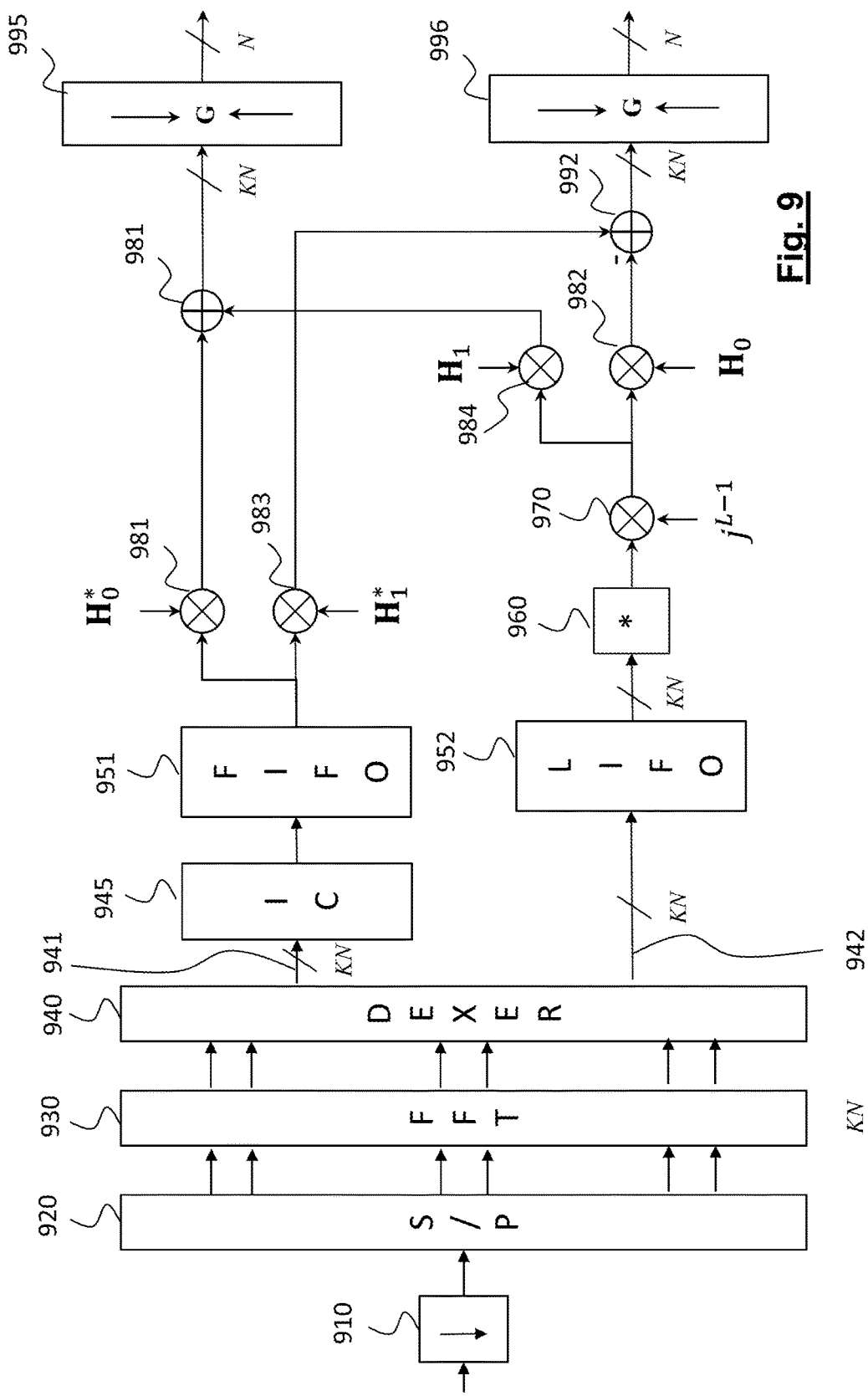

FIG. 8A schematically shows a first example of transmission of two sequences of blocks of symbols by an FBMC transmitter using a first block Alamouti coding;

FIG. 8B schematically shows a second example of transmission of two sequences of blocks of symbols by an FBMC transmitter using a second block Alamouti coding;

FIG. 9 schematically shows the architecture of an FS-FBMC receiver, according to a second embodiment of the invention, used to receive sequences of blocks transmitted according to the schematic representation in FIG. 8B.

DETAILED DESCRIPTION OF PARTICULAR EMBODIMENTS

Figure 1:
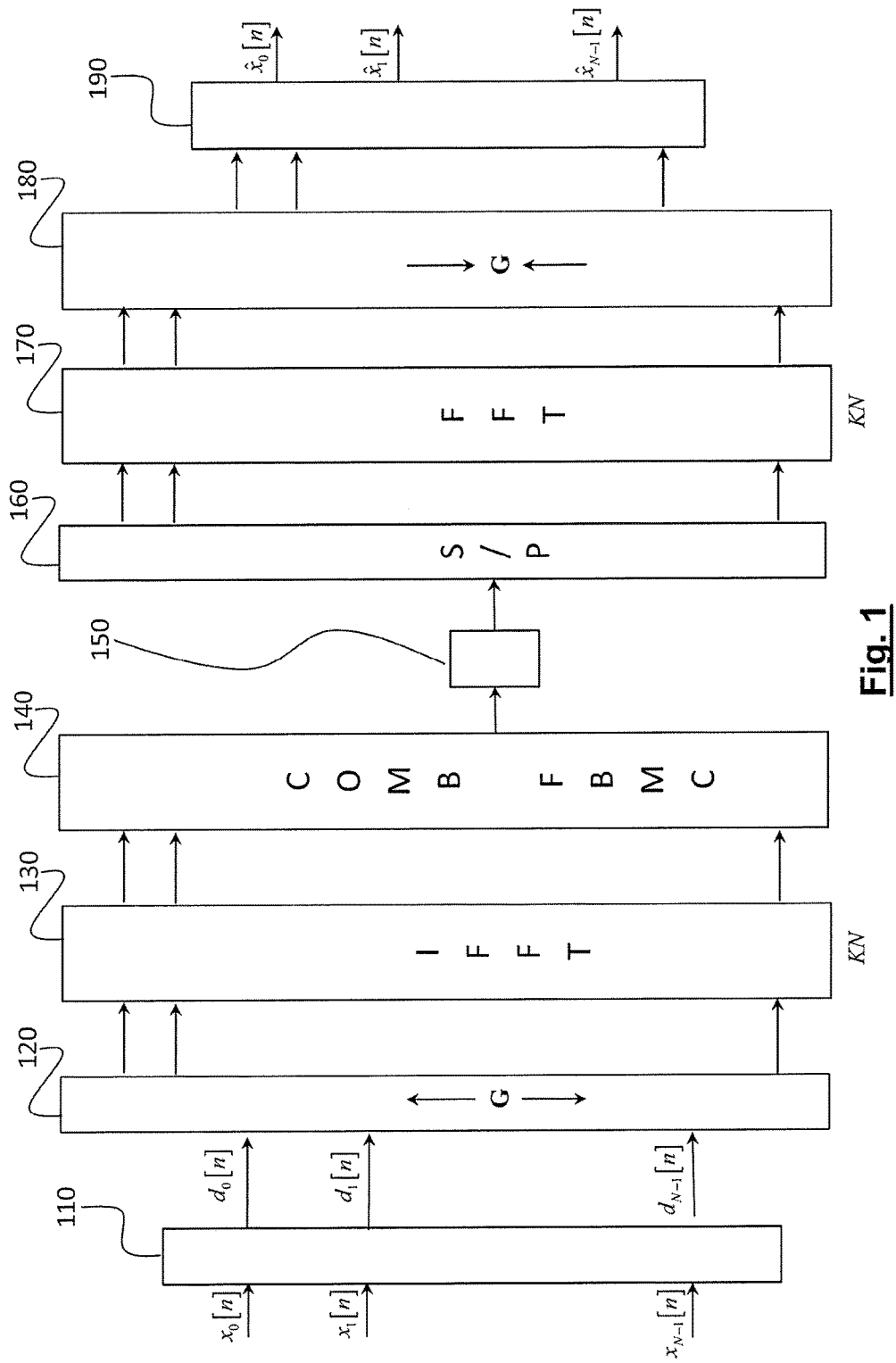
Figure 2:
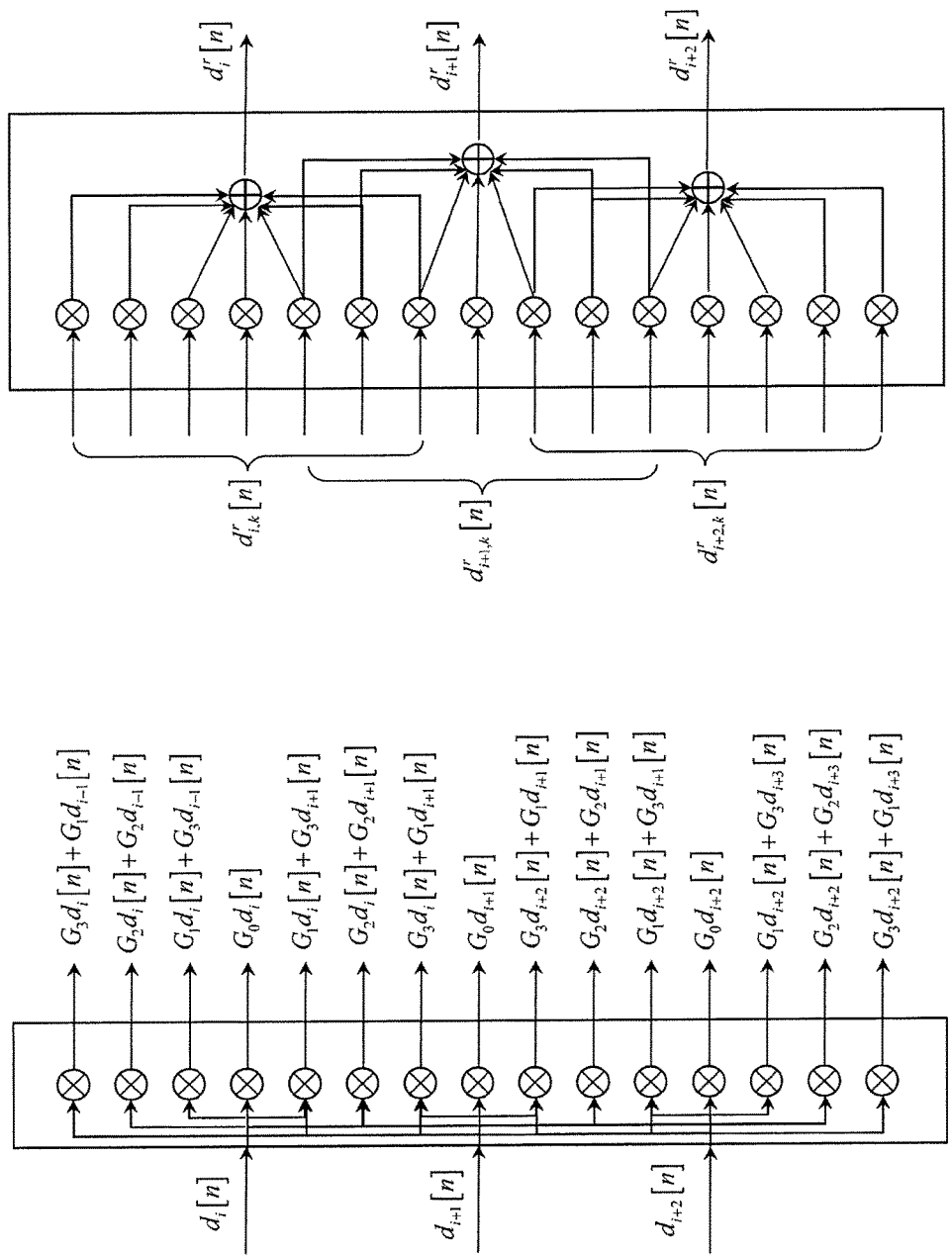
FIG. 2A shows the spectral spreading undertaken upstream of the IFFT module of FIG. 1.
FIG. 2B shows the spectral de-spreading undertaken downstream of the IFFT module of FIG. 1.

In order to facilitate understanding of the notations, we will first of all consider an FS-FBMC transmitter as described in relation to FIG. 1.

Unlike preceding notations, the column vectors $X^m$, m=0, ..., L−1, of size N, will, in what follows, represent the input data vectors, in other words the data at the input to the OQAM modulator. The elements of these vectors are therefore real value elements.

The signal transmitted by the transmitter at the instant m can be represented by a column vector $Z^m$ of size KN whose elements are samples at a frequency Nf. The vector $Z^m$ can be expressed as a function of the input data vectors $X^{m-(K-1)}, \ldots, X^m, \ldots, X^{m+(K-1)}$, that is:

$$Z^m = F^H G(X^m \odot M^m) + \sum_{p=1}^{K-1} Q_{\frac{pN}{2}} F^H G(X^{m-p} \odot M^{m-p}) + Q_{KN-\frac{pN}{2}} F^H G(X^{m+p} \odot M^{m+p}) \quad (8)$$

where $\odot$ is the Hadamard product, F is the discrete Fourier transform matrix of size KN×KN, G is a matrix of size KN×N representing the spectral spreading and the transfer function of the prototype filter in the frequency domain, that is:

$$G = \begin{pmatrix} G_{K-1} & 0 & \cdots & 0 \\ \vdots & G_{K-1} & \ddots & \vdots \\ G_0 & \vdots & \ddots & 0 \\ \vdots & G_0 & \ddots & G_{K-1} \\ G_{-K+1} & \vdots & \ddots & \vdots \\ 0 & G_{-K+1} & \ddots & G_0 \\ \vdots & \ddots & \ddots & \vdots \\ 0 & \cdots & 0 & G_{-K+1} \end{pmatrix} \quad (9)$$

$M^m$ is a column vector of size N which expresses the OQAM modulation, namely a vector whose elements are given by:

$$M^m[k] = j^{m+k}(-1)^{km} \quad (10)$$

and $Q_l$ is an offset matrix of l samples, of size KN×KN defined by:

$$Q_l = \begin{pmatrix} 0_{l \times (KN-l)} & 0_{l \times l} \\ I_{KN-l} & 0_{(KN-l) \times l} \end{pmatrix} \quad (11)$$

where $T_{KN-l}$ is the identity matrix of size (KN−l)×(KN−ℓ)

Figure 3:
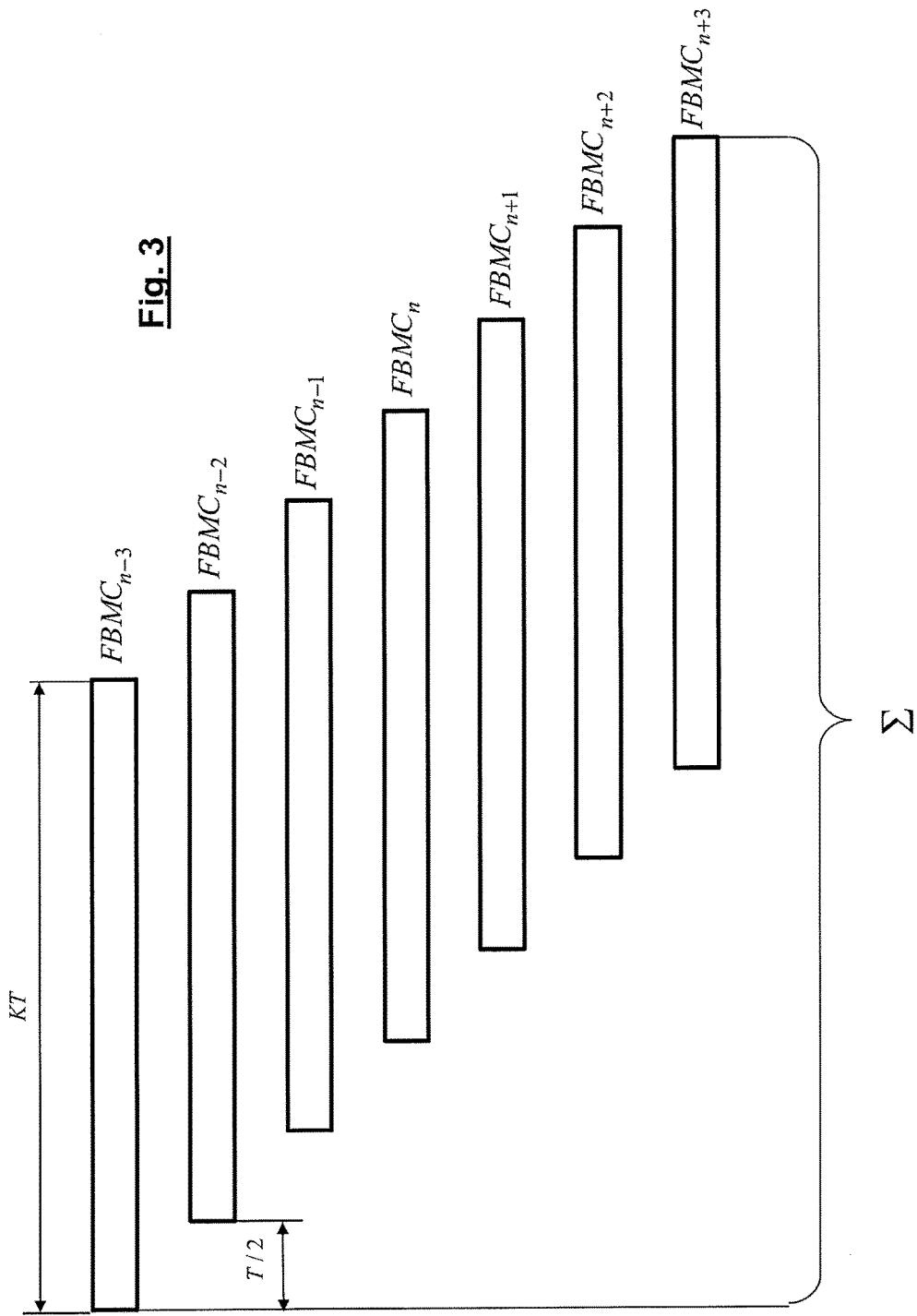
FIG. 3 shows the combination of FBMC symbols in FIG. 1.

It will be understood that the terms beneath the summation sign in expression (8) represent the 2K−1 FBMC symbols which are combined in FIG. 3.

The signal received by the FBMC receiver at the instant in may similarly be expressed in the form of a data vector at the output of the OQAM demodulator, here referred to as $Y^m$, of size KN. The vector $Y^m$ can be expressed as a function of the vector $Z^m$ which represents the transmitted signal, either by carrying out abstraction of the noise term:

$$Y^m = (G^H F H_0 Z^m) \odot M^{m*} \quad (12)$$

or, given that $G^H F F^H G = I_N$ and that $(X^m \odot M^m) \odot M^{m*} = X^m$:

$$Y^m = H_0 \left( X^m + \sum_{p=1}^{K-1} U^p (X^{m-p} \odot M^{m-p}) \odot M^{m*} + \sum_{p=1}^{K-1} V^p (X^{m+p} \odot M^{m+p}) \odot M^{m*} \right) \quad (13)$$

where:

$$U^p = G^H F Q^{\frac{pN}{2}} F^H G \text{ and } V^p = G^H F Q^{KN-\frac{pN}{2}} F^H G \quad (14)$$

It will be seen that $G^H = G^T$ given that the coefficients of the filter transfer matrix are real.

It is now assumed that a block Alamouti coding is carried out, with a coding matrix defined by:

$$\overline{C} = \begin{pmatrix} \overline{X}_0 & \overline{X}_1 \\ -\overline{X}_1 T & \overline{X}_0 T \end{pmatrix} \quad (15)$$

The basic idea of the invention is to use a receiver implemented in the frequency domain (FS-FBMC receiver) and to combine the two blocks at the output of the FFT module (module 170 in FIG. 1), during the first and second use of the channel respectively.

Then $X_0^m$ is the $m^{th}$ input data vector of the first block $\overline{X}_0$ and $X_1^m$ the $m^{th}$ input data vector of the second block $\overline{X}_1$ respectively. Furthermore $W_0^m$ is the $m^{th}$ sample vector at the output to the FFT module, before de-spreading and filtering, during the first use of the channel. Similarly, $W_1^m$ is the $m^{th}$ sample vector at the output of the FFT module, before de-spreading and filtering, during the second use of the channel.

During the first use of the channel the vector $W_0^m$ can be expressed as follows:

$$W_0^m = H_0 \left( G(X_0^m \odot M^m) + \sum_{p=1}^{K-1} A^p (X_0^{m-p} \odot M^{m-p}) + \sum_{p=1}^{K-1} B^p (X_0^{m+p} \odot M^{m+p}) \right) + H_1 \left( G(X_1^m \odot M^m) + \sum_{p=1}^{K-1} A^p (X_1^{m-p} \odot M^{m-p}) + \sum_{p=1}^{K-1} B^p (X_1^{m+p} \odot M^{m+p}) \right) \quad (16)$$

where $A^p = F Q^{\frac{pN}{2}} F^H$ and $B^p = F Q^{KN-\frac{pN}{2}} F^H$. \quad (17)

Similarly, during the second use of the channel the vector $W_1^m$ can be expressed as follows:

$$W_1^m = -H_0 \left( G(X_1^{L-1-m} \odot M^m) + \quad (18) \right.$$

-continued $$\sum_{p=1}^{K-1} A^p \left( X_1^{L-1-m+p} \odot M^{m-p} \right) + \sum_{p=1}^{K-1} B^p \left( X_1^{L-1-m-p} \odot M^{m+p} \right) \right) +$$

$$H_1 \left( G(X_0^{L-1-m} \odot M^m) + \sum_{p=1}^{K-1} A^p \left( X_0^{L-1-m+p} \odot M^{m-p} \right) + \right.$$

$$\left. \sum_{p=1}^{K-1} B^p \left( X_0^{L-1-m-p} \odot M^{m+p} \right) \right)$$

an expression in which good use has been made of the fact that the input data vectors were real value vectors.

It will be seen that the transfer matrices for the elementary channels, $H_0$ and $H_1$ are here of size KN×KN due to the spectral spreading.

If the block of vectors $W_1^m$, m=0, . . . , L−1, is transformed by time-reversal and complex conjugation of the block, the $m^{th}$ vector of the block transformed in this way may be written, from (18):

$$W_1^{L-m-1*} = \qquad (19)$$

$$-H_0^* \left( G(X_1^m \odot M^{L-1-m^*}) + \sum_{p=1}^{K-1} A^{p*} (X_1^{m+p} \odot M^{L-1-m-p^*}) + \right.$$

$$\left. \sum_{p=1}^{K-1} B^{p*} (X_1^{m-p} \odot M^{L-1-m+p^*}) \right) +$$

$$H_1^* \left( G(X_0^m \odot M^{L-1-m^*}) + \sum_{p=1}^{K-1} A^{p*} (X_0^{m+p} \odot M^{L-1-m-p^*}) + \right.$$

$$\left. \sum_{p=1}^{K-1} B^{p*} (X_0^{m-p} \odot M^{L-1-m+p^*}) \right)$$

That is by taking into consideration that:

$$M^{L-1-m*}=-M^m j^{L-1}; M^{L-1-m-p*}=-M^{m+p} j^{L-1}; M^{L-1-m+p*}=-M^{m-p} j^{L-1}$$

where it is assumed that the size L of the block was an even number, and that:

$$A^{p*}=B^p; B^{p*}=A^p$$

the vector $W_1^{L-m-1*}$ of the reversed block can finally be written as:

$$W_1^{L-m-1*} = H_0^* j^{L-1} \left( G(X_1^m \odot M^m) + \right. \qquad (20)$$

$$\left. \sum_{p=1}^{K-1} B^p (X_1^{m+p} \odot M^{m+p}) + \sum_{p=1}^{K-1} A^p (X_1^{m-p} \odot M^{m-p}) \right) -$$

$$H_1^* j^{L-1} \left( G(X_0^m \odot M^m) + \sum_{p=1}^{K-1} B^p (X_0^{m+p} \odot M^{m+p}) + \right.$$

$$\left. \sum_{p=1}^{K-1} B^p (X_0^{m-p} \odot M^{m-p}) \right)$$

The vectors of the transmitted data $X_0^m$, $X_1^m$ can be estimated by undertaking a combination of vectors $W_0^m$ and $W_1^{L-m-1*}$ $$\check{X}_0^m = \mu(H_0^* W_0^m + j^{L-1} H_1 W_1^{L-1-m*}) \qquad (21\text{-}1)$$

$$\check{X}_1^m = \mu(H_1^* W_0^m - j^{L-1} H_0 W_1^{L-1-m*}) \qquad (21\text{-}2)$$

where $$\mu = \frac{1}{Tr(H_0^H H_0 + H_1^H H_1)},$$

then filtering and spectral de-spreading and finally an OQAM demodulation:

$$\hat{X}_0^m = \mu G(H_0^* W_0^m + j^{L-1} H_1 W_1^{L-1-m*}) \odot M^{m*} \qquad (22\text{-}1)$$

$$\hat{X}_1^m = \mu G(H_1^* W_0^m - j^{L-1} H_0 W_1^{L-1-m*}) \odot M^{m*} \qquad (22\text{-}2)$$

FIG. 6 schematically shows the architecture of an FS-FBMC receiver, according to a first embodiment of the invention, used to receive sequences of blocks of symbols coded by a block Alamouti coding.

The receiver comprises a sampling module 610 for sampling the signal received in a base band at the rate of Nf where N is the number of sub-carriers and f is the frequency of the FBMC symbols. The samples are grouped together in the form of blocks of size KN by a serial-parallel converter 620.

The receiver is assumed to be synchronised on the FBMC symbols, in other words, the start of an FFT window coincides with the first sample of an FBMC symbol (transmitted by one or the other of the transmission antennae). Moreover, the receiver is assumed to be synchronised on the instants of use of the channel so that it knows the instants at which the first and second blocks are received.

The blocks of samples undergo a FFT of size KN in the FFT module 630.

A demultiplexer 640 supplies the vectors at the output from the FFT at a first output 641 during the first use of the channel and at a second output 642 during the second use of the channel. The L vectors (of size KN) generated sequentially at the first output are stored in a first buffer memory 651, configured in the form of a FIFO (first-in first-out) buffer. The L vectors generated sequentially at the second output are also stored in a second buffer memory 652 configured in the form of a LIFO (last-in first-out) buffer. The module 660 thus reads the L vectors in the reverse order to that in which they are stored (LIFO), so as to perform a time-reversal and furthermore undertakes a complex conjugation of each of these vectors. A multiplier 670 multiplies the elements of the vectors at the output from the module 660 by $(j)^{L-1}$, in other words by j if L is an even number.

Each element of a vector generated at the first output is multiplied in 681 by the complex conjugate of the coefficient of the first elementary channel between the first transmission antenna and the reception antenna, at the frequency of the sub-carrier carrying the element in question (the operation is symbolised here by a multiplication of the vector at the output from the buffer memory by the matrix $H_0^*$) and in 683 by the complex conjugate of the coefficient of the second elementary channel between the second transmission antenna and the reception antenna, at the same sub-carrier frequency (the operation is symbolised here by a multiplication of the vector of samples at the FFT output by the matrix $H_1^*$). The matrices $H_0$ and $H_1$ are here meant to be of size KN×KN and here represent the coefficients of the elementary channels for the KN spectrally spread subcarriers. An identical channel coefficient can be chosen for the K frequencies produced by a given sub-channel. It is assumed that the matrices $H_0$ and $H_1$ are constant over the duration of the sequence (flat fading assumption).

Similarly, each element in a vector generated at the second output is multiplied in 682 by the coefficient for the channel between the first transmission antenna and the reception antenna at the frequency of the sub-carrier carrying the element in question (operation symbolised by a multiplication of the vector at the output of the FFT by the matrix $H_0$) and in 684 by the coefficient of the channel between the second transmission antenna and the reception antenna at the frequency of the same sub-carrier (operation symbolised by a multiplication of the vector at the output of the FFT by the matrix $H_1$).

The vectors at the output of the multiplier 681 are summed, element by element, with those at the output of the multiplier 684, in the summer 691. The successive vectors of size N at the output of the summer 691 are then supplied to a first spectral de-spreading and filtering module 695.

Similarly, the vectors at the output of the multiplier 682 are subtracted, element by element, from those at the output of the multiplier 683, in the summer 692. The successive vectors of size N at the output of the summer 692 are then supplied to a second spectral de-spreading and filtering module 696.

The vectors obtained by the first and second modules 695 and 696 then undergo OQAM demodulation (not shown) in order to obtain the estimated data vectors $\hat{X}_0^m$ and $\hat{X}_1^m$, m=0, ..., L−1.

FIG. 7 schematically shows the architecture of a FS-FBMC receiver according to one alternative of the first embodiment of the invention.

Unlike the FS-FBMC receiver of FIG. 6, the receiver here comprises two reception antennas. The signal received on the first antenna during the first use of the channel is demodulated into a base band then sampled at a rate Nf in the sampler 711. The samples are grouped together in the form of blocks of size KN by the serial-parallel converter 721 before undergoing a sliding FFT of size KN in 731. The vectors of the samples at the output of the FFT are then processed on a first path.

Similarly the signal received on the second antenna during the second use of the channel is demodulated into a base band then sampled at a rate Nf in the sampler 712. The samples are grouped together in the form of blocks of size KN by the serial-parallel converter 722 before undergoing a sliding FFT of size KN in 732. The vectors of the samples at the output of the FFT are then processed on a second path.

The remaining elements 751-796 are, respectively, identical to elements 651-696 of FIG. 6.

It will be understood that unlike the FS-FBMC receiver in FIG. 6, no demultiplexing is carried out at the FFT output since both paths are separated from the reception antennas. It is necessary, however, that the receiver be synchronised with the FBMC symbol and, moreover, that the first path be synchronised with the instants of the first use of the channel and that the second path be synchronised with the instants of second use of the channel.

The structure of the receiver of FIG. 6 or of FIG. 7 can be simplified when the transmitter, instead of using the coding given by (15), uses the block Alamouti coding defined by:

$$\bar{C}' = \begin{pmatrix} \bar{X}_0 & \bar{X}_1 \\ -(j^{L-1})\bar{X}_1 T & (j^{L-1})\bar{X}_0 T \end{pmatrix} \quad (23)$$

In this case the multiplication by the factor $(j^{L-1})$ can be removed at the reception and consequently the multiplier 670 or 770 can be omitted.

FIG. 8A schematically shows a first example of the transmission of two sequences of blocks of symbols by an FBMC transmitter using a first block Alamouti coding, as given by the coding matrix given by the expression (15).

The blocks of data to be transmitted are here considered upstream of the OQAM modulation.

A first sequence of blocks 801 is formed by a first guard block 811, a first block of L input data vectors, $\bar{X}_0$, 821, a second guard block, 831, followed by a first transformed block, $-\bar{X}_1 T$, 841, obtained by time-reversal and change of sign of the first input data block.

A second sequence of blocks 802 is formed by a first guard block 812, a second block of L input data vectors, $\bar{X}_1$, 822, a second guard block, 832, followed by a second transformed block, $\bar{X}_0 T$, 842, obtained by time-reversal and change of sign of the first input data block.

The guard blocks are made up of null vectors in order to prevent interference between the data blocks and the transformed blocks.

The first and second sequences are respectively transmitted by the first and second antennas, 892 and 892, after FBMC modulation.

FIG. 8B schematically shows a second example of the transmission of two sequences of blocks of symbols by an FBMC transmitter using a second block Alamouti coding.

The second example is identical to the first except that the first guard block is replaced in the first sequence by a first preamble 811' and in the second by sequence by a second preamble 812'. The other blocks remain unchanged and are therefore not described again.

The first and second preambles generate interference which affects the first symbols of the blocks $\bar{X}_0$ and $\bar{X}_1$, interference which does not symmetrically affect the blocks $-\bar{X}_1 T$ and $\bar{X}_0 T$. This asymmetry does not allow the interference for the input data vectors $X_0^m$, $X_1^m$ at the beginning of the block, to be eliminated. The preamble symbols are however known to the receiver and it is possible to eliminate this interference once an estimate of the transmission channel is available.

FIG. 9 schematically shows the architecture of an FS-FBMC receiver, according to a second embodiment of the invention, used to receive sequences of blocks in FIG. 8B.

Apart from the interference canceller 945, the elements 910 to 996 are identical to the elements 610 to 696 already described in relation to FIG. 6.

The interference canceller 945 is located on the first output from the demultiplexer 940 and therefore only operates during the first use of the channel. Its purpose is to eliminate the interference generated at the receiver by the first and second preambles 811' and 812', on the payload $\bar{X}_0$, $\bar{X}_1$. More precisely, the interference canceller receives an estimate of the transmission channel, namely the transfer matrices for the elementary channels $H_0$ and $H_1$. Since the preambles 811' and 812' are known to the receiver, the latter can reconstitute the contribution of the preambles to the signal received during the reception of blocks $\bar{X}_o$ and $\bar{X}_1$, it being understood that only the first K+E vectors received at the beginning of these blocks are affected by this interference, where K is the length of the prototype filter and E the time-spreading of the channel expressing as number of samples. The contribution of the preambles is subtracted from the received signal at the output of the FFT module 830. Once the interference is eliminated, the transmitted blocks $\bar{X}_0$ and $\bar{X}_1$ may be estimated in accordance with (22-1) and (22-1), it being understood once more that the term $j^{L-1}$ may be omitted if the block Alamouti coding defined by (23) is used. Those skilled in the art will moreover understand that this second embodiment may also take the form of the alternative in FIG. 7 by adding an interference canceller at the output of the FFT module 731.

The invention claimed is:

1. A method comprising:

receiving, by a receiver, signals transmitted by an FBMC transmitter using block Alamouti coding, where the FBMC transmitter uses a plurality N of sub-carriers and an overlap factor K of prototype filters;

translating the signal received by the receiver to a base band, sampled at a frequency Nf where f is the half-frequency of the FBMC symbols;

then performing a sliding FFT of size KN on the signal to provide sample vectors, wherein said sample vectors are received on a first path during a first channel use and on a second path during a second channel use, the channel comprising a first elementary channel between a first antenna of the transmitter and a first antenna of the receiver and a second elementary channel between a second antenna of the transmitter and a second antenna of the receiver, said first and second elementary channels being characterized, respectively, by a first and a second transfer matrix ($H_0$, $H_1$);

multiplying each vector ($W_0^m$) in a sequence of vectors received on the first path by the conjugate of the first transfer matrix in order to provide a first vector and by the conjugate of the second transfer matrix in order to provide a second vector;

time-reversing a sequence of vectors received on the second path and conjugating each vector ($W_1^{L-1-m}$) of the second sequence before multiplying each vector ($W_1^{L-1-m}$) of the second sequence by the first transfer matrix to provide a third vector and by the second transfer matrix to provide a fourth vector; and combining the first and fourth vectors to provide a first combined vector, the second and third vectors being combined to provide a second combined vector, where the first and second combined vectors are spatially de-spread and filtered in the frequency domain by the prototype filters to provide, respectively, an estimate of a first data vector ($\hat{X}_0^m$) transmitted via the first antenna of the transmitter and of a second data vector ($\hat{X}_1^m$) transmitted via the second transmitter antenna.

2. The method according to claim 1, wherein the first and second antennas of the receiver form a single antenna, and in that said sample vectors are demultiplexed on the first path during the first use of the channel and on the second path during the second use of the channel.

3. The method of according to claim 1, wherein the first and second antennas are distinct, with the first path being associated with the first antenna of the receiver and the second path being associated with the second antenna of the receiver.

4. The method of according to claim 1, where the transmitter uses the following matrix as a matrix for block Alamouti coding:

$$\overline{C} = \begin{pmatrix} \overline{X}_0 & \overline{X}_1 \\ -\overline{X}_1 T & \overline{X}_0 T \end{pmatrix}$$

where $\overline{X}_0$ and $\overline{X}_1$ are first and second blocks of input data vectors transmitted during the first use of the channel via the first antenna and the second antenna of the receiver respectively, $\overline{X}_1 T$ is a first transformed block obtained by time-reversal and of the second block, $\overline{X}_0 T$ is a second transformed block obtained by time-reversal of the first block, where the blocks $-\overline{X}_1 T$ and $\overline{X}_0 T$ are transmitted during the second use of the channel via the first antenna and the second antenna of the transmitter respectively, wherein the vectors of the second sequence are multiplied by a factor ($j^{L-1}$) where L is the size of the first and second blocks of input data vectors, after conjugation and before multiplication by the first and second transfer matrices.

5. The method according to claim 4, wherein the input data vector of rank m in the first block of input data vectors, $X_0^m$, and the input data vector of rank m in the second block of input data vectors, $X_1^m$, are estimated from:

$$\hat{X}_0^m = \mu G(H_0^* W_0^m + j^{L-1} H_1 W_1^{L-1-m*}) \odot M^{m*}$$

$$\hat{X}_1^m = \mu G(H_1^* W_0^m - j^{L-1} H_0 W_1^{L-1-m*}) \odot M^{m*}$$

where $\hat{X}_0^m$ and $\hat{X}_1^m$ are respectively the estimates of the vectors $X_0^m$ and $X_1^m$, $H_0$, $H_1$ are respectively the first and second transfer matrices, $W_0^m$ the vector of rank m received on the first path, $W_1^{L-1-m}$ the vector of rank L−1−m received on the second path, $M^m$ a vector which represents a OQAM coding of vectors $X_0^m$ and $X_1^m$, G a matrix which represents, in the frequency domain, a spectral de-spreading and filtering by prototype filters, $\mu$ is a coefficient of normalisation and $\odot$ represents the Hadamard product.

6. The method according to claim 1, wherein the transmitter uses the following matrix as a matrix for block Alamouti coding:

$$\overline{C}' = \begin{pmatrix} \overline{X}_0 & \overline{X}_1 \\ -(j^{L-1})\overline{X}_1 T & (j^{L-1})\overline{X}_0 T \end{pmatrix}$$

where $\overline{X}_0$ and $\overline{X}_1$ are the first and second blocks of input data vectors transmitted during the first use of the channel via the first antenna and the second antenna, respectively, of the transmitter, $\overline{X}_1 T$ is a first transformed block obtained by time-reversal and of the second block, $\overline{X}_0 T$ is a second transformed block obtained by time reversal of the first block, wherein the vectors of the second sequence, after conjugation, are multiplied directly by the first and second transfer matrices.

7. The method according to claim 6, wherein the input data vector of rank m in the first block of input data vectors, $X_0^m$, and the input data vector of rank m in the second block of input data vectors, $X_1^m$, are estimated from:

$$\hat{X}_0^m = \mu G(H_0^* W_0^m + H_1 W_1^{L-1-m*}) \odot M^{m*}$$

$$\hat{X}_1^m = \mu G(H_1^* W_0^m - H_0 W_1^{L-1-m*}) \odot M^{m*}$$

where $\hat{X}_0^m$ and $\hat{X}_1^m$ are respectively the estimates of the vectors $X_0^m$ and $X_1^m$, $H_0$, $H_1$ are respectively the first and second transfer matrices, $W_0^m$ the vector of rank m received on the first path, $W_1^{L-1-m}$ the vector of rank L−1−m received on the second path, $M^m$ a vector which represents a OQAM coding of vectors $X_0^m$ and $X_1^m$, G a matrix which represents, in the frequency domain, a spectral de-spreading and filtering by prototype filters, µ is a coefficient of normalisation and ⊙ represents the Hadamard product.

8. The method according to claim 4, where the first and second blocks of input data vectors are preceded, respectively, by first and second preambles, a first guard block made up of null vectors separating the first block of data vectors and the first transformed block, a second guard block made up of null vectors separating the second block of data vectors and the second transformed block, wherein the first and second preambles are known to the receiver and that on the first path, at the output of the sliding FFT, elimination of the interference affecting the vectors received on the first path is carried out by subtraction at this path of the contribution due to the first and second preambles.

9. A receiver comprising:
processing circuitry configured to
receive signals transmitted by an FBMC transmitter using block Alamouti coding, where the FBMC transmitter uses a plurality N of sub-carriers and an overlap factor K of prototype filters,
translate the signal received by the receiver to a base band, sampled at a frequency Nf where f is the half-frequency of the FBMC symbols,
perform a sliding FFT of size KN on the signal to provide sample vectors, wherein said sample vectors are received on a first path during a first channel use and on a second path during a second channel use, the channel comprising a first elementary channel between a first antenna of the transmitter and a first antenna of the receiver and a second elementary channel between a second antenna of the transmitter and a second antenna of the receiver, said first and second elementary channels being characterized, respectively, by a first and a second transfer matrix ($H_0$, $H_1$),
multiply each vector ($W_0^m$) in a sequence of vectors received on the first path by the conjugate of the first transfer matrix in order to provide a first vector and by the conjugate of the second transfer matrix in order to provide a second vector,
time-reverse a sequence of vectors received on the second path and conjugating each vector ($W_1^{L-1-m}$) of the second sequence before multiplying each vector ($W_1^{L-1-m}$) of the second sequence by the first transfer matrix to provide a third vector and by the second transfer matrix to provide a fourth vector, and
combine the first and fourth vectors to provide a first combined vector, the second and third vectors being combined to provide a second combined vector, where the first and second combined vectors are spatially de-spread and filtered in the frequency domain by the prototype filters to provide, respectively, an estimate of a first data vector ($\hat{X}_0^m$) transmitted via the first antenna of the transmitter and of a second data vector ($\hat{X}_1^m$) transmitted via the second transmitter antenna.

* * * * *